US011657929B2

(12) United States Patent
Vaccaro et al.

(10) Patent No.: US 11,657,929 B2
(45) Date of Patent: May 23, 2023

(54) CABLE CUFFS FOR MULTIPLE SIZED CABLES

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 102 days.

(21) Appl. No.: 17/189,567

(22) Filed: Mar. 2, 2021

(65) Prior Publication Data

US 2021/0313094 A1  Oct. 7, 2021

Related U.S. Application Data

(60) Provisional application No. 63/003,963, filed on Apr. 2, 2020.

(51) Int. Cl.
*H02G 15/113* (2006.01)
*H01B 7/36* (2006.01)

(52) U.S. Cl.
CPC .................... *H01B 7/368* (2013.01)

(58) Field of Classification Search
CPC .................................................. H02G 15/113
(Continued)

(56) References Cited

U.S. PATENT DOCUMENTS

| 4,426,108 A | 1/1984 | Kesselman |
| 4,839,471 A * | 6/1989 | Clark .................. H02G 15/013 |
| | | 174/92 |

(Continued)

FOREIGN PATENT DOCUMENTS

| CN | 207364498 U | 5/2018 |
| CN | 208571510 U | 3/2019 |
| CN | 208939469 U | 6/2019 |

OTHER PUBLICATIONS

PCT Notification of Transmittal of the International Search Report and the Written Opinion of the International Searching Authority, or the Declaration, dated Jun. 21, 2021, for corresponding PCT International Application No. PCT/US2021/070210.

*Primary Examiner* — Chau N Nguyen
(74) *Attorney, Agent, or Firm* — Myers Bigel, P.A.

(57) ABSTRACT

The present disclosure describes cable cuffs. A cable cuff may include a first half including a main body with a first cable recess and a first securing feature, and a second half including a main body with a second cable recess and a second securing feature. The first cable recess may include a first flex retention section and the second cable recess may include a second flex retention section. The first half and the second half may be connected via a hinge. The first half is mated with the second half such that the first and second cable recesses form a pocket for receiving and grasping a cable. The first and second securing features engage to maintain the first half and the second half in a mated condition. The first and second flex retention sections reside within and extend into the pocket to engage a cable grasped therein. Cable management systems are also provided herein.

14 Claims, 6 Drawing Sheets

(58) Field of Classification Search
USPC .......................................................... 174/92
See application file for complete search history.

(56) References Cited

U.S. PATENT DOCUMENTS

| | | | | |
|---|---|---|---|---|
| 5,796,041 | A * | 8/1998 | Suzuki | H02G 15/18 |
| | | | | 174/92 |
| 5,834,694 | A * | 11/1998 | Bakker | B60R 16/0207 |
| | | | | 174/152 G |
| 6,259,346 | B1 * | 7/2001 | Nakano | H01F 17/06 |
| | | | | 336/174 |
| 6,276,727 | B1 | 8/2001 | Schlicht | |
| 6,955,558 | B1 * | 10/2005 | Low | H02G 15/18 |
| | | | | 439/587 |
| 8,431,823 | B2 * | 4/2013 | Du | H02G 1/00 |
| | | | | 174/72 A |
| 8,516,727 | B1 * | 8/2013 | Maraia | G09F 3/205 |
| | | | | 40/661 |
| 9,061,448 | B2 * | 6/2015 | Hepfinger | H02G 3/0481 |
| 9,799,428 | B2 * | 10/2017 | Wieneke | G09F 3/0295 |
| 9,972,223 | B2 * | 5/2018 | Larsen | G09F 3/0295 |
| 2005/0167147 | A1 * | 8/2005 | Marsac | G02B 6/4446 |
| | | | | 174/92 |

* cited by examiner

CABLE CUFFS FOR MULTIPLE SIZED CABLES

RELATED APPLICATION(S)

The present application claims priority to and the benefit of U.S. Provisional Patent Application Ser. No. 63/003,963, filed Apr. 2, 2020, the disclosure of which is hereby incorporated herein in its entirety.

FIELD

The present application is directed generally toward telecommunications equipment, and more particularly, cable cuffs for multiple sized cables.

BACKGROUND

Colored electrical tape is a popular cable management solution for the organization and identification of cables, particularly when connecting remote radio units (RRUs), antennas, and other telecommunications equipment. For example, in a base station antenna, many cables are connected to different ports for different sectors and technical characteristics (such as band, beam, and so on) in each sector. In order to distinguish and identify cables, after these cables have been connected to different ports, several tapes in pre-selected colors are labelled (e.g., wrapped) on each cable for port identification. However, it is found that cable labelling is a lengthy process, resulting in a high labor cost. In addition, wrapping tapes in cables that have been connected to a BSA may not be easily operated, since cables are very close to each other. It is also found that the currently used tapes are vulnerable to UV, aging, operation temperature, and the like, and thus may not be durable in severe environments.

Cable cuffs have been engineered to be a direct alternative to the electrical tape for color coding without the use of any adhesives or chemicals making them friendlier to the environment. An exemplary cable cuff is the Color Coded Cuff, available from Primus Electronics (Morris, Ill.). However, a majority of the cable cuffs currently available today are each sized to fit a cable having a specific diameter, and thus, require a technician to carry multiple sizes of cable cuffs in each of the available colors.

SUMMARY

A first aspect of the present invention is directed to a cable cuff. The cable cuff may include a first half including a main body with a first cable recess and a first securing feature, and a second half including a main body with a second cable recess and a second securing feature. The first cable recess may include a first flex retention section and the second cable recess may include a second flex retention section. The first half and the second half may be connected via a hinge. The first half may be mated with the second half such that the first and second cable recesses form a pocket for receiving and grasping a cable. The first and second securing features engage to maintain the first half and the second half in a mated condition as the cable cuff grips the cable. The first and second flex retention sections reside within and extend into the pocket to engage a cable grasped therein.

Another aspect of the present invention is directed to a cable management system. The cable management system may include a cable, and a plurality of color-coded cable cuffs. Each cable cuff may include a first half including a main body with a first cable recess and a first securing feature, and a second half including a main body with a second cable recess and a second securing feature. The first cable recess may include a first flex retention section, and the second cable recess may include a second flex retention section. The first half and the second half may be connected via a hinge. The first half may be mated with the second half such that the first and second cable recesses form a pocket for receiving and grasping the cable. The first and second securing features engage to maintain the first half and the second half in a mated condition. The first and second flex retention sections reside within and extend into the pocket to engage a cable grasped therein. A cable may be held within the pocket of a respective cable cuff, and a combination of colors of the cable cuffs may indicate an antenna beam sector and/or technical characteristics of the antenna beam sector of the respective cable.

Another aspect of the present invention is directed to a cable cuff. The cable cuff may include a first half including a main body with a first cable recess and a first securing feature, a second half including a main body with a second cable recess and a second securing feature, an annular recess at one end of the cable cuff, and an annular hook at the opposing end of the cable cuff. The first half and the second half may be connected via a hinge. The first half may be mated with the second half such that the first and second cable recesses form a pocket for receiving and grasping a cable. The first and second securing features engage to maintain the first half and the second half in a mated condition. The annular recess may be sized and configured to receive the annular hook of another cable cuff such that the two cable cuffs lock together lengthwise when the first and second halves are in the mated condition.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
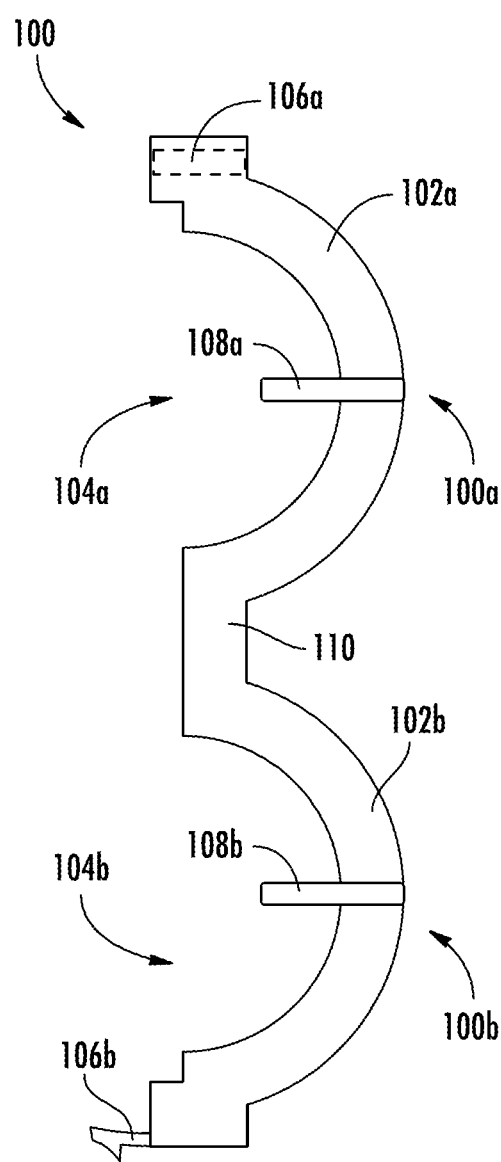
FIG. 1A is a side view of a cable cuff according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10'").

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1B:
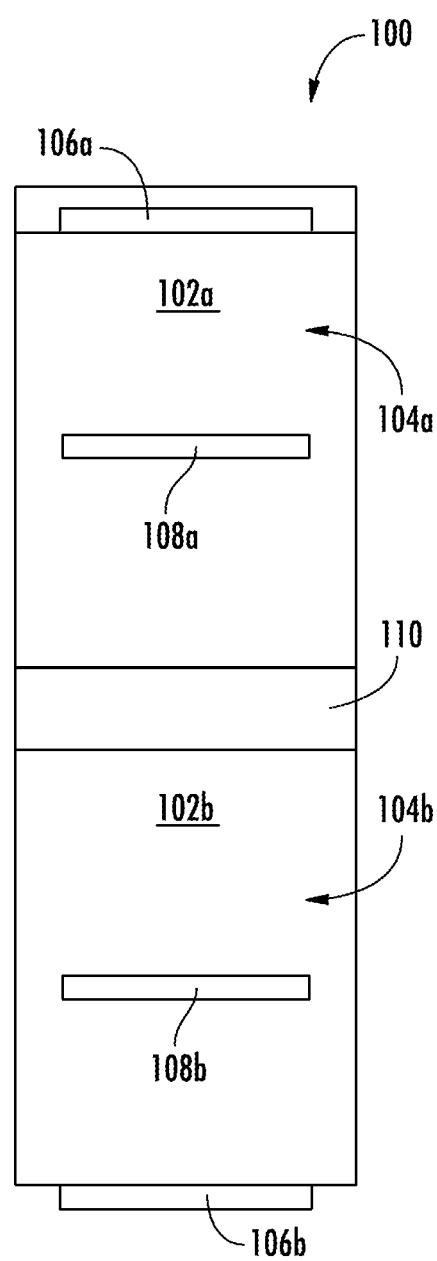
FIG. 1B is a top view of the cable cuff of FIG. 1A.

Referring to FIGS. 1A-1B, a cable cuff 100 according to embodiments of the present invention is illustrated. As shown in FIGS. 1A-1B, the cable cuff 100 has first half 100*a* and a second half 100*b*. As used herein, the term "half" referring to a portion of a cable cuff indicates one of two pieces or sections that, when combined, form an entire cable cuff. The term "half" is not intended to be limited to pieces or sections that are of exactly the same size; instead, one "half" may comprise more than 50 percent of the circumference of the cable cuff (e.g., 60 or 65 percent), and the other "half" may comprise less than 50 percent of the circumference of the cable cuff (e.g., 35 or 40 percent).

The first half 100*a* of the cable cuff 100 includes a main body 102*a* with a cable recess 104*a* and a securing feature 106*a*. In some embodiments, the securing feature 106*a* may be a slot. In some embodiments, the cable recess 104 may comprise a flex retention section 108*a*.

Similarly, the second half 100*b* of the cable cuff 100 includes a main body 102*b* with a second cable recess 104*b* and a second securing feature 106*b*. In some embodiments, the second securing feature 106*b* may be a barb. In some embodiments, the second cable recess 104*b* may comprise a second flex retention section 108*b*. In some embodiments, the first half 100*a* and the second half 100*b* of the cable cuff 100 may be connected via a hinge 110. As discussed in further detail below, the hinge 110 may allow the first half 100*a* to be folded over and mated with the second half 100*b* (see, e.g., FIGS. 3A-3B). In some embodiments, the hinge 110 may be a "living" hinge that is integrated into the cable cuff 100 to form an overall monolithic component.

In some embodiments, the second securing feature 106*b* (e.g., a barb) of the second half 100*b* may be sized and configured to be received by the first securing feature 106*a* (e.g., a slot) of the first half 100*a*. For example, in some embodiments, the securing features 106*a*, 106*b* may be configured to engage such that the first half 100*a* and the second half 100*b* of the cable cuff 100 are maintained in a mated condition (see, e.g., FIG. 3B). When the first half 100*a* of the cable cuff 100 is mated with the second half 100*b*, the first and second cable recesses 104*a*, 104*b* may form a pocket 112 configured to receive and grasp a cable 130 (see, e.g., FIGS. 3A-3B). Other known methods for engaging the first and second halves 100*a*, 100*b* of the cable cuff 100 may be used (i.e., used for the securing features 106*a*, 106*b*), for example, a hook and latch or snap-fit mechanism.

As shown in FIGS. 1A-1B, in some embodiments, the first and second flex retention sections 108*a*, 108*b* may be beams that extend away from an inner surface of their respective halves 100*a*, 100*b* and that define a plane that is generally parallel relative to the hinge 110. In some embodiments, only one half (100*a* or 100*b*) of the cable cuff 100 may include a flex retention section (108*a* or 108*b*) and the other half (100*a* or 100*b*) may contain no specific feature to help retain a cable 130 within the cable cuff 100. In some embodiments, the flex retention sections 108*a*, 108*b* may reside generally in the center of the respective main bodies 102a, 102b of the cable cuff 100. In some embodiments, the flex retention sections 108a, 108b may extend from one or both ends of a respective main body 102a, 102b. Typically, the flex retention sections 108a, 108b extend into the pocket 112 at least 15 percent of the radius of the halves 100a, 100b. In some embodiments, the flex retention sections extend into the pocket 112 at least 50 percent of the radius of the halves 100a, 100b.

Figure 3A:
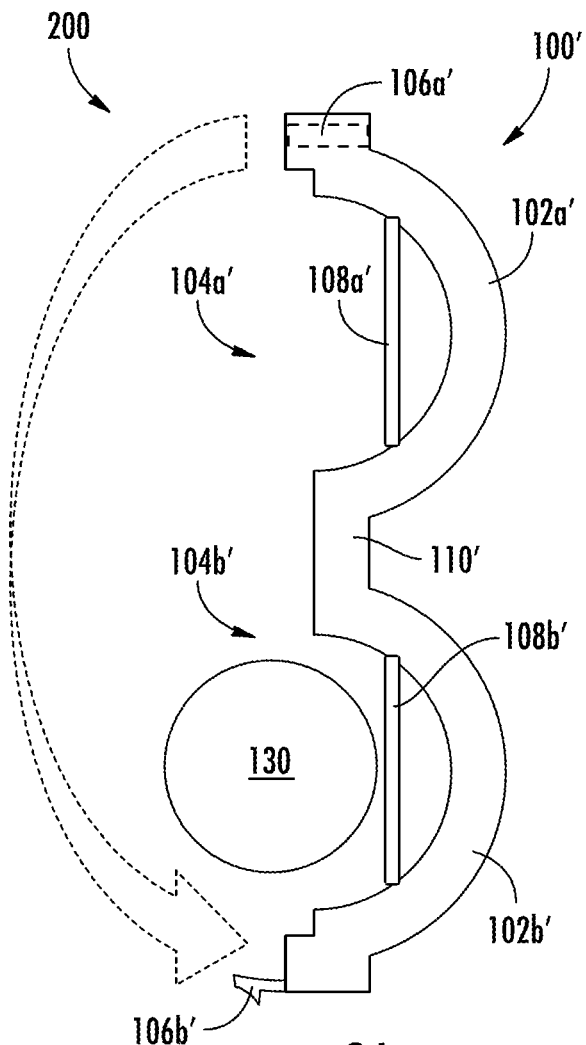
FIG. 3A is a side view of the cable cuff of FIG. 2A illustrating how the cable cuff is secured around a cable according to embodiments of the present invention.
Figure 3B:
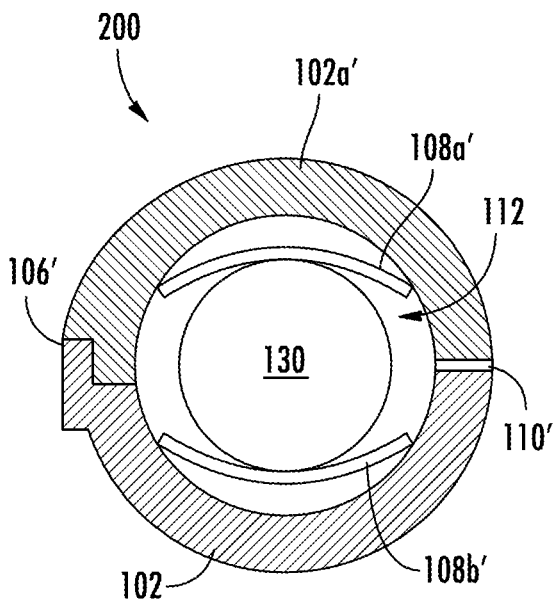
FIG. 3B is a side section view of the cable cuff of FIG. 3A secured around the cable.

The flex retention sections 108a, 108b may be adapted for gripping a cable 130 when the cable 130 is placed within the recess 104a, 104b (i.e., pocket 112) of the cable cuff 100 (see, e.g., FIG. 3B). For example, the flex retention sections 108a, 108b may be formed of a polymeric material which gives the flex retention sections 108a, 108b a certain degree of flexibility. In some embodiments, the polymeric material forming the flex retention sections 108a, 108b may comprise rubber, polypropylene, polyethylene, ethylene propylene diene monomer (EPDM) rubber, silicone, or the like.

As shown in FIG. 3B, this flexibility allows the flex retention sections 108a, 108b to deflect to enable insertion of a cable 130 within the pocket 112. Once a cable 130 is positioned within the cable cuff 100 and the first and second halves 100a, 100b of the cuff 100 are in a mated condition to form the pocket 112, the resilient nature of the polymeric material allows the flex retention sections 108a, 108b to recover, thereby gripping the cable 130 and securing the cable 130 within the pocket 112 of the cable cuff 100. The flexibility of the flex retention sections 108a, 108b allows the cable cuff 100 of the present invention to be used with different sizes of cables 130. For example, in some embodiments, the cable cuff 100 may be configured to fit on a cable 130 having a diameter in the range of about ⅜ inch to about ½ inch.

Figure 2A:
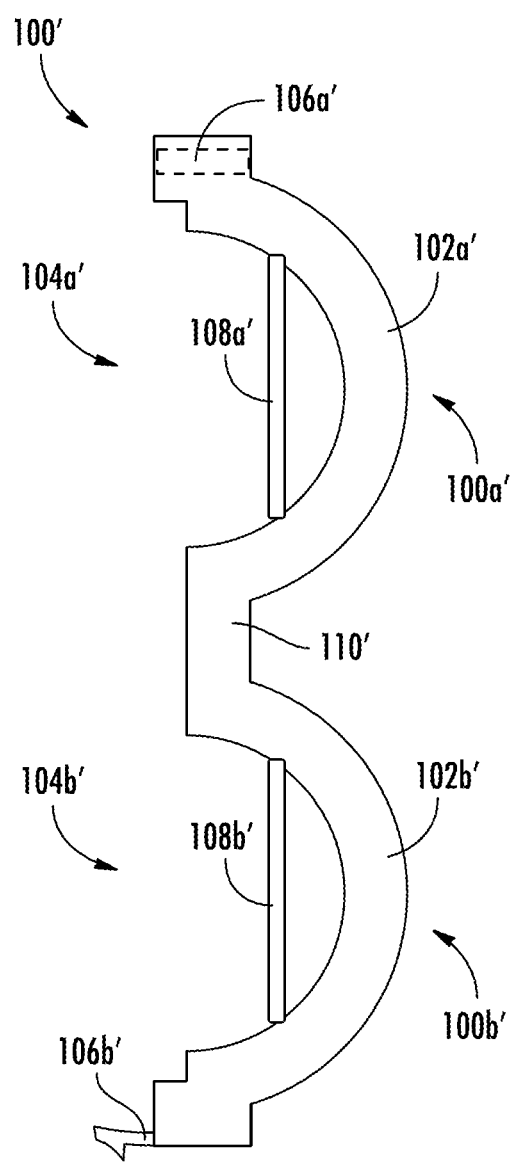
FIG. 2A is a side view of an alternative cable cuff according to embodiments of the present invention.
Figure 2B:
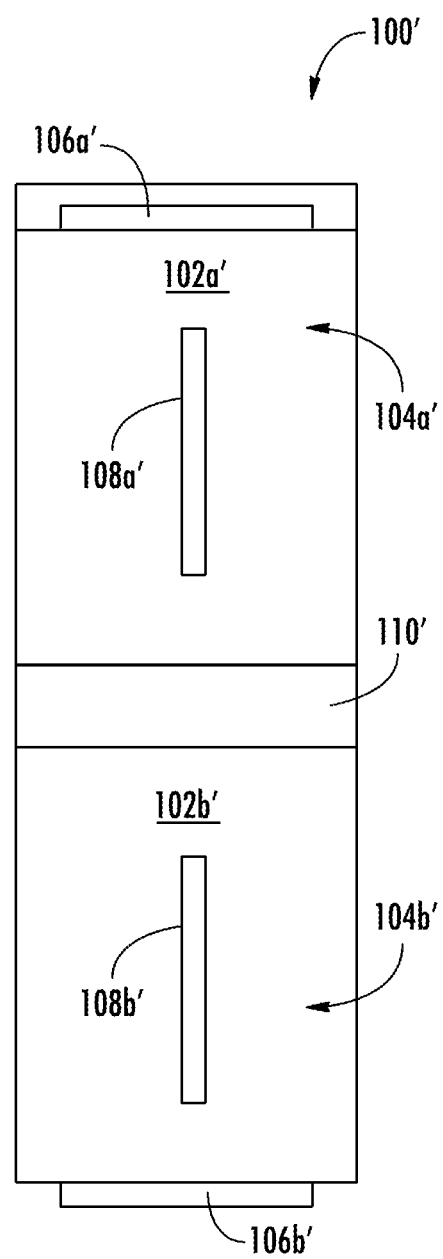
FIG. 2B is a top view of the cable cuff of FIG. 2A.

Referring to FIGS. 2A-2B, an alternative cable cuff 100' according to embodiments of the present invention is illustrated. Properties and/or features of the cable cuff 100' may be as described above in references to FIGS. 1A-1B and duplicate discussion thereof may be omitted herein for the purposes of discussing FIGS. 2A-2B. The cable cuff 100' is similar to the cable cuff 100 described herein except for the orientation of the flex retention sections 108a', 108b'. As shown in FIGS. 2A-2B, in some embodiments, the flex retention sections 108a', 108b' may be beams that define a chord across the generally semicircular inner surface of their respective halves 100a', 100b'. The first and second flex retention sections 108a', 108b' are adapted for gripping the cable 130 within the pocket 112 of the cable cuff 100' (see, e.g., FIG. 3B).

As discussed herein, and illustrated in FIG. 3A, the cable cuffs 100, 100' of the present invention are configured such that first half 100a, 100' may be folded over and mated with the second half 100b, 100b' via a hinge 110, 110'. As shown in FIGS. 3A-3B, a cable 130 may be placed within one of the recesses 104a, 104a', 104b, 104b' of the cable cuff 100, 100' and held within the pocket 112 formed by the respective recesses 104a, 104a', 104b, 104b' when the first half 100a, 100a' is folded and mated with the second half 100b, 100b'.

As shown in FIG. 3B, the securing features 106a, 106a', 106b, 106b' of the cable cuff 100, 100' engage and secure the cable 130 within the pocket 112 of the cable cuff 100, 100'. When a cable 130 is secured within the pocket 112, the flexibility of the flex retention sections 108a, 108a', 108b, 108b' allows the flex retention sections 108a, 108a', 108b, 108b' to deflect and grip cables 130 having a range of different diameters.

Figure 3C:
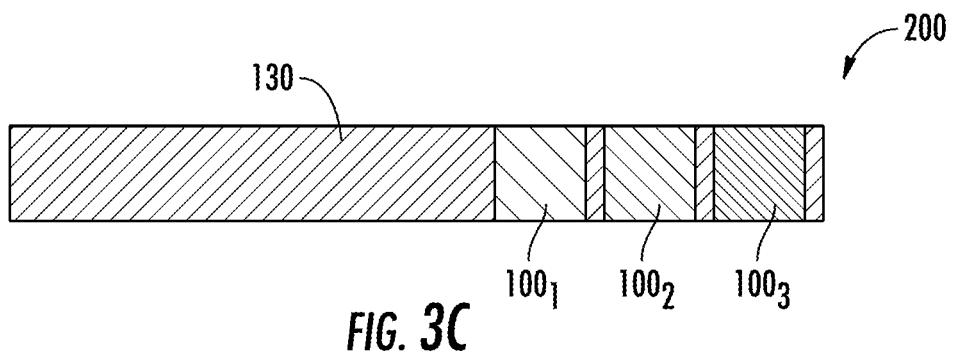
FIG. 3C is a top view of three different colored cable cuffs secured around a cable.

Referring to FIG. 3C, in some embodiments, multiple cable cuffs 100, 100' of the present invention having different colors may be employed. Certain conventions and standards exist that require multiple bands of different colors to indicate specific characteristics of one or more cables 130, for example, cables 130 connected to different ports of a base station antenna. Different colored cable cuffs 100, 100' may be used to help identify the different sectors and/or technical characteristics (e.g., band, beam, etc.) in each sector. For example, a cable 130 with consecutive red, green, and blue bands may indicate a specific antenna beam sector and/or technical specifications of the antenna beam sector for that respective cable 130. As shown in FIG. 3C, three cable cuffs $100_1$, $100_2$, $100_3$ are secured to a cable 130. The colors of the cable cuffs $100_1$, $100_2$, $100_3$ provide a quick and easy way for a technician to identify the antenna beam sector and direction associated with a specific cable 130, thereby assisting technicians during installation, maintenance, and management of multiple cables 130 connected to a base station antenna.

For example, after a base station antenna site is constructed, using the conventional color coding scheme for the cable cuffs $100_1$, $100_2$, $100_3$ allows subsequent visitors (e.g., engineers, technicians) on the site to quickly and easily identify an antenna beam sector and direction without having to figure out which way is north. In addition, the colored cable cuffs $100_1$, $100_2$, $100_3$ provide a quick and easy way to identify a cable 130, if trouble develops. Thus, if a site engineer says that s/he is having trouble with the red-brown-brown (RBB), everyone knows which cable 130 they are referring to.

Figure 4:
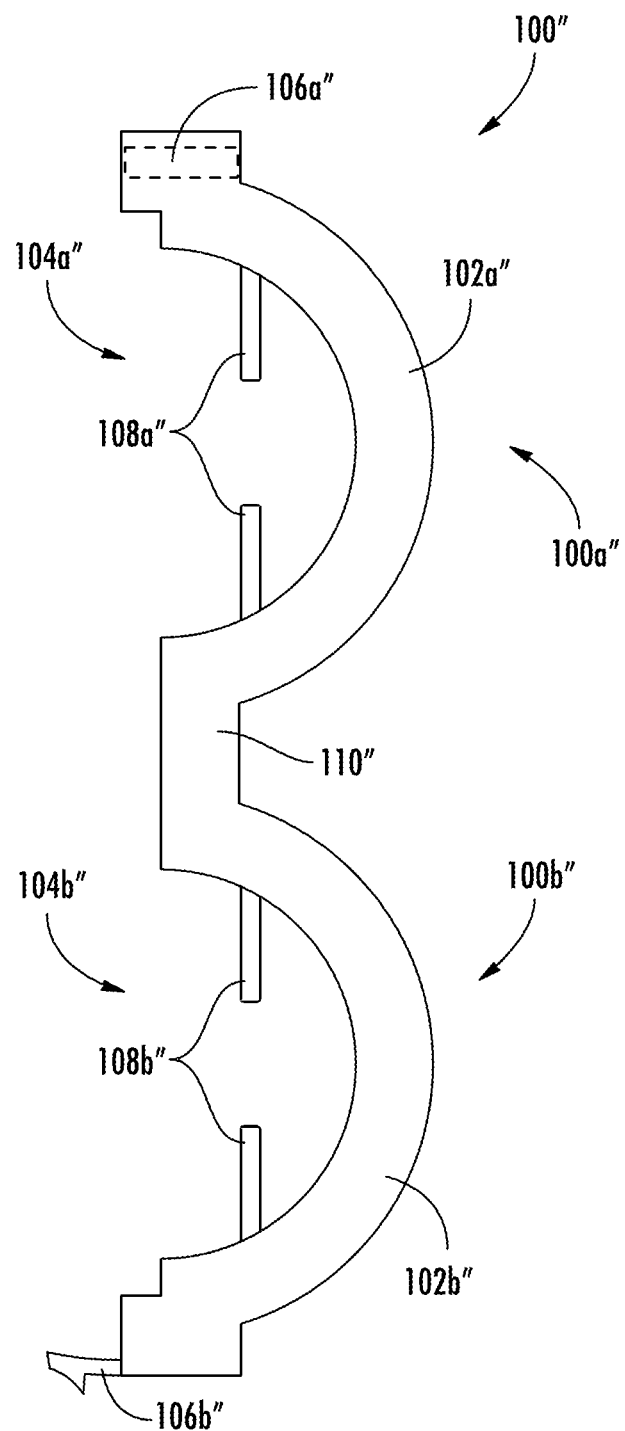
FIG. 4 is a side view of an alternative cable cuff according to embodiments of the present invention.

Referring to FIG. 4, an alternative cable cuff 100" according to embodiments of the present invention is illustrated. Properties and/or features of the cable cuff 100" may be as described above in references to FIGS. 1A-2B and duplicate discussion thereof may be omitted herein for the purposes of discussing FIG. 4. The cable cuff 100" is similar to the cable cuffs 100, 100' described herein except for the flex retention sections 108a", 108b". As shown in FIG. 4, in some embodiments, the flex retention sections 108a", 108b" may be cantilevered beams that extend generally perpendicularly relative to the hinge 110". Similar to the flex retention sections 108a, 108a', 108b, 108b' described herein, the first and second flex retention sections 108a", 108b" are adapted for gripping the cable 130 within the pocket 112 of the cable cuff 100" (see, e.g., FIG. 3B). In some embodiments, each of the retention sections 108a", 108b" may extend away from the inner surface of their respective halves 100a, 100b at least 50 percent of the radius of the halves 100a, 100b.

Figure 5A:
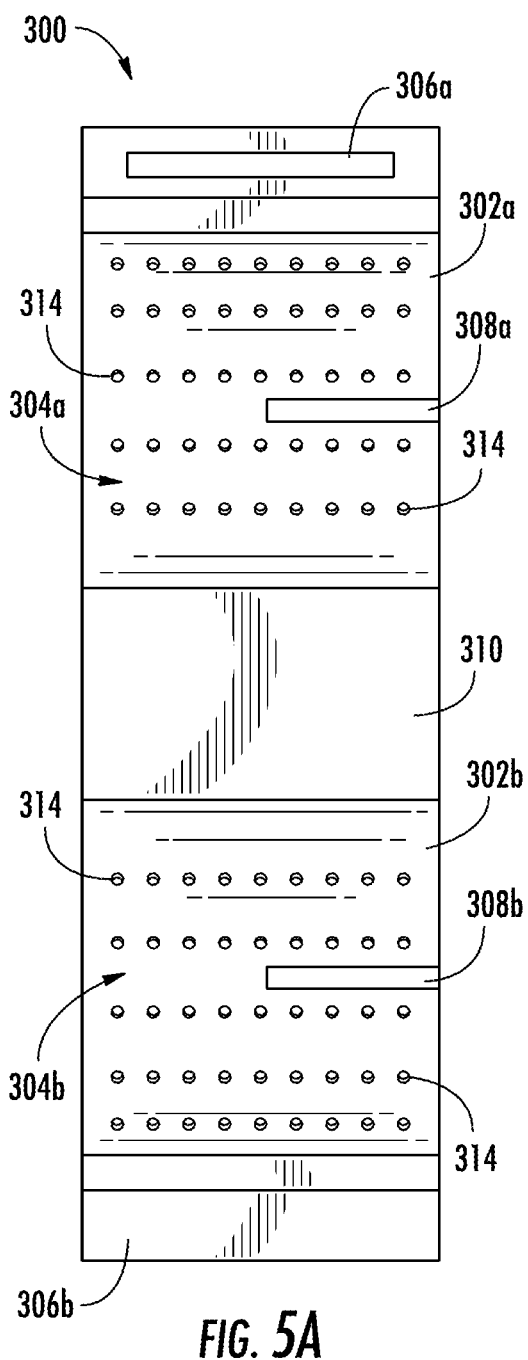
FIG. 5A is a top view of an alternative cable cuff according to embodiments of the present invention.
Figure 5B:
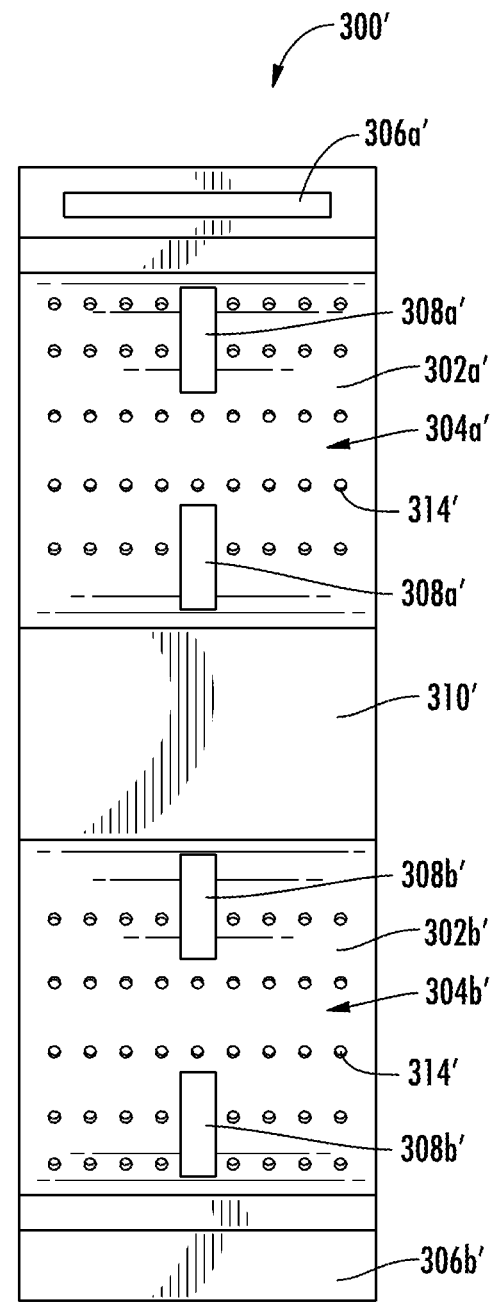
FIG. 5B is a top view of another alternative cable cuff according to embodiments of the present invention.

Referring to FIGS. 5A-5B, alternative cable cuffs 300, 300' according to embodiments of the present invention are illustrated. Properties and/or features of the cable cuffs 300, 300' may be as described above in references to FIGS. 1A-2B, and FIG. 4, and duplicate discussion thereof may be omitted herein for the purposes of discussing FIG. 5A-5B. The cable cuffs 300, 300' are similar to the cable cuffs 100, 100, 100" described herein except for the cable cuffs 300, 300' further comprise a plurality of dimples 314, 314' adapted for gripping a cable 130 within the pocket 312. In some embodiments, the dimples 314, 314' are configured to assist the flex retention sections 308a, 308a', 308b, 308b' in gripping a cable 130 secured within the cable cuffs 300, 300'.

The flex retention sections 308a, 308a', 308b, 308b' may reside in any of the orientations described herein. As shown in FIG. 5A, the flex retention sections 308a, 308b of cable cuff 300 may extend in a direction that is generally parallel relative to the hinge 310. In some embodiments, the flex retention sections 308a, 308b may extend from an end of the main body 302a, 302b and about halfway across the main body 302a, 302b. As shown in FIG. 5B, the flex retention sections 308a, 308b of cable cuff 300 may be cantilevered beams that extend generally perpendicularly relative to the hinge 310'.

Figure 6:
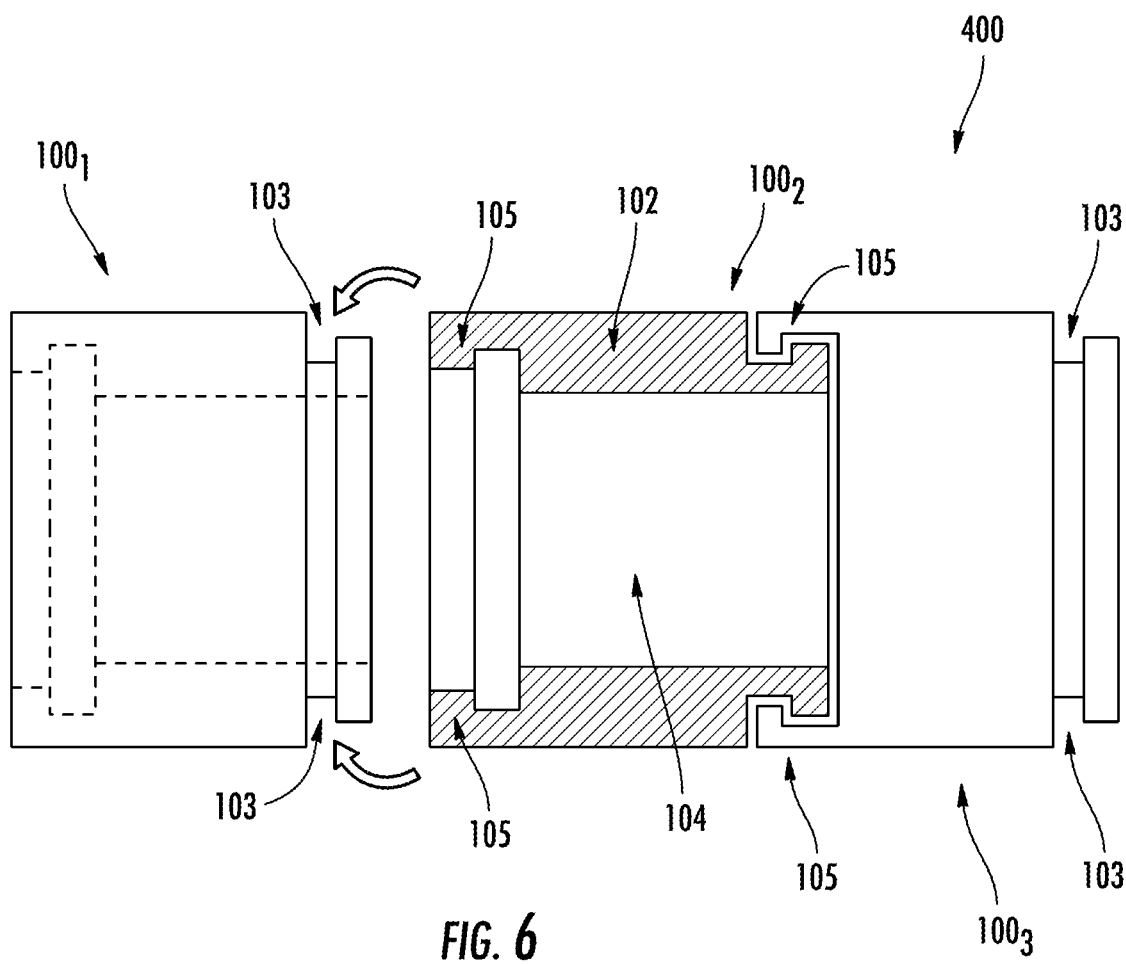
FIG. 6 is a side view of a cable cuff assembly according to embodiments of the present invention.

Referring now to FIG. 6, in some embodiments, multiple cable cuffs $100_1$, $100_2$, $100_3$ may configured such that two or more of the cuffs $100_1$, $100_2$, $100_3$ may be secured (or locked) together in a cable cuff assembly 400, for example, when multiple cable cuffs $100_1$, $100_2$, $100_3$ are engaged on a cable 130. As shown in FIG. 6, in some embodiments, each cable cuff $100_1$, $100_2$, $100_3$ may include an annular recess 103 at one end and an annular hook 105 at the opposing end. The annular recess 103 of one cable cuff $100_1$, $100_2$, $100_3$ may be sized and configured to receive the annular hook 105 of another cable cuff $100_1$, $100_2$, $100_3$ such as when the first half 100a of the cable cuff $100_1$, $100_2$, $100_3$ is being folded over and mated with the second half 100b of the cable cuff $100_1$, $100_2$, $100_3$ around a respective cable 103. The corresponding annular recesses 103 and hooks 105 of adjacent cable cuffs $100_1$, $100_2$, $100_3$ lock together (e.g., similar to a tongue and groove locking mechanism), thereby allowing multiple cable cuffs $100_1$, $100_2$, $100_3$ to be secured together lengthwise on a cable 130.

The cable cuffs 100, 100', 100", 300, 300' described herein may be formed of a polymeric material. In some embodiments, the polymeric material comprises rubber, polypropylene, polyethylene, ethylene propylene diene monomer (EPDM) rubber, and/or silicon. In some embodiments, different colored cable cuffs 100, 100', 100", 300, 300' of the present invention may be used on one or more cables 130. The color of each cable cuff 100, 100', 100", 300, 300' either alone or in combination with additional cable cuffs may indicate an antenna beam sector and/or technical characteristics of the antenna beam sector a respective cable 130, thereby assisting technicians during installation, maintenance, and management of the cables 130.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable cuff, comprising:
a first half including a polymeric main body with a first cable recess and a first securing feature, the first cable recess comprising a first flex retention section, wherein opposing ends of the first flex retention section are coupled to an inner surface of the first cable recess and a first gap resides between the first flex retention section and the main body of the first half; and
a second half including a polymeric main body with a second cable recess and a second securing feature, the second cable recess comprising a second flex retention section, wherein opposing ends of the second flex retention section are coupled to an inner surface of the second cable recess and a second gap resides between the second flex retention section and the main body of the second half,
wherein the first half and the second half are connected via a hinge,
wherein the first half is mated with the second half such that the first and second cable recesses form a pocket for receiving and grasping a cable,
wherein the first and second securing features engage to maintain the first half and the second half in a mated condition,
wherein the first and second flex retention sections reside within and extend into the pocket to engage the cable grasped therein,
wherein the first and second flex retention sections are beams that extend parallel or perpendicular relative to the hinge, and
wherein the first and second gaps allow the first and second flex retention sections to deflect radially outwardly, thereby allowing the cable cuff to be used with different sizes of cables.

2. The cable cuff of claim 1, wherein the first and second flex retention sections are beams that define planes extending generally parallel relative to the hinge, the first and second flex retention sections being adapted for gripping the cable within the pocket.

3. The cable cuff of claim 1, wherein the first and second flex retention sections are beams that define chords extending across, respectively, the first and second halves, the first and second flex retention sections being adapted for gripping the cable within the pocket.

4. The cable cuff of claim 1, wherein the first and second flex retention sections are cantilevered beams, the first and second flex retention sections being adapted for gripping the cable within the pocket.

5. The cable cuff of claim 1, wherein the hinge is a living hinge to form an overall monolithic component.

6. The cable cuff of claim 1, wherein the first securing feature is a barb and the second securing feature is a slot, and wherein the barb is configured to engage the slot to maintain the first half and the second half in a mated condition.

7. The cable cuff of claim 1, in combination with the cable, wherein the cable is held within the pocket of the cable cuff.

8. The cable cuff of claim 7, wherein the cable cuff is color-coded and the color of the cable cuff indicates an antenna beam sector and/or technical characteristics of the antenna beam sector with respect to the cable.

9. The cable cuff of claim 1, wherein the cable cuff is sized and configured to fit on the cable having a diameter in the range of about ⅜ inch to about ½ inch.

10. The cable cuff of claim 1, wherein the cable cuff is formed of a polymeric material.

11. A cable management system, the system comprising:
one or more cables; and
a plurality of color-coded cable cuffs, each cable cuff comprising:
a first half including a main body with a first cable recess and a first securing feature, the first cable recess comprising a first flex retention section; and
a second half including a main body with a second cable recess and a second securing feature, the second cable recess comprising a second flex retention section,
wherein the first half and the second half are connected via a hinge,
wherein the first half is mated with the second half such that the first and second cable recesses form a pocket for receiving and grasping a respective one of the one or more cables, wherein the first and second securing features engage to maintain the first half and the second half in a mated condition, wherein the first and second flex retention sections reside within and extend into the pocket, the first and second flex retention sections configured to deflect radially outwardly to engage the respective cable grasped therein, and wherein the first and second flex retention sections are beams that extend perpendicular relative to the hinge, wherein the respective cable is held within the pocket of a respective cable cuff, and a combination of colors of the cable cuffs indicates an antenna beam sector and/or technical characteristics of the antenna beam sector with respect to the respective cable.

12. The cable management system of claim 11, wherein the first and second flex retention sections of each cable cuff are beams that define chords extending across, respectively, the first and second halves, the first and second flex retention sections being adapted for gripping the respective cable within the pocket.

13. The cable management system of claim 11, wherein the first and second flex retention sections of each cable cuff are cantilevered beams, the first and second flex retention sections being adapted for gripping a respective cable within the pocket.

14. A cable management system, the system comprising:
one or more cables; and
a plurality of color-coded cable cuffs, each cable cuff comprising:

a first half including a main body with a first cable recess and a first securing feature, the first cable recess comprising a first flex retention section; and a second half including a main body with a second cable recess and a second securing feature, the second cable recess comprising a second flex retention section, wherein the first half and the second half are connected via a hinge, wherein the first half is mated with the second half such that the first and second cable recesses form a pocket for receiving and grasping a respective one of the one or more cables, wherein the first and second securing features engage to maintain the first half and the second half in a mated condition, wherein the first and second flex retention sections reside within and extend into the pocket, the first and second flex retention sections configured to deflect radially outwardly to engage the respective cable grasped therein, wherein the first and second flex retention sections of each cable cuff are beams that define planes extending generally parallel relative to the hinge, the first and second flex retention sections being adapted for gripping the respective cable within the pocket, and wherein the respective cable is held within the pocket of a respective cable cuff, and a combination of colors of the cable cuffs indicates an antenna beam sector and/or technical characteristics of the antenna beam sector with respect to the respective cable.

\* \* \* \* \*